(No Model.)

C. BROWNING.
CAR COUPLING.

No. 254,106. Patented Feb. 28, 1882.

Witnesses
Alex. McFarland
David Hamm

Inventor
Clinton Browning

UNITED STATES PATENT OFFICE.

CLINTON BROWNING, OF SHOUSETOWN, ASSIGNOR OF ONE-HALF TO LINDSAY & McCUTCHEON, OF ALLEGHENY CITY, PENNSYLVANIA.

CAR-COUPLING.

SPECIFICATION forming part of Letters Patent No. 254,106, dated February 28, 1882.

Application filed August 15, 1881. (No model.)

*To all whom it may concern:*

Be it known that I, CLINTON BROWNING, a citizen of the United States, residing at Shousetown, in the county of Allegheny and State of Pennsylvania, have invented a new and useful Improvement in Railroad-Car Couplings; and I do hereby declare the following to be a full, clear, and exact description thereof.

My invention relates to improvements in car-couplings in which a rotating hook is hinged to a draw-head and the coupling is effected by the hook rotating inwardly, of which the Janney coupling is a representative, patented February 25, 1879, No. 212,703, the drawings of which I have copied and used in illustrating my invention.

The objects of my improvements are to rotate the rotary hook automatically to the desired position for the purpose of effecting the coupling; second, to automatically retain the rotary hook in proper position until required to rotate in the act of coupling.

In the Janney coupling the rotary hook, when not in use, having no retaining device by which it can be held in a certain position, is left free to rotate to any uncertain point by the jarring of the cars or by any object with which it may come in contact otherwise than by the coupling process. The object of my invention is, further, to overcome this very troublesome defect, and to hold the rotary hook in a certain position, so that the coupling of cars can be accomplished with greater facility and less danger of breakage, which is often occasioned by both hooks being closed, or partially so, when the cars are being brought together, also with less liability to bodily accidents than when the couplings are manipulated by hand.

I attain these objects by the two following devices, illustrated in the accompanying drawings, which I shall proceed to describe in detail, and in which—

Figure 1:
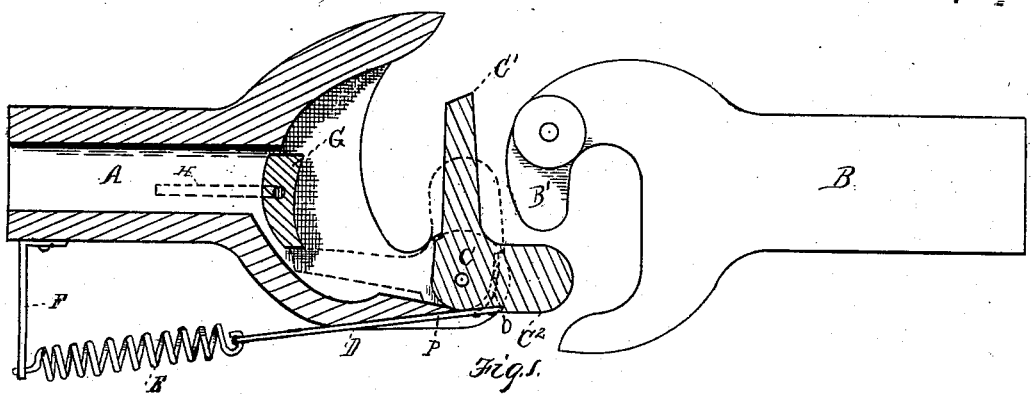
Figure 2:
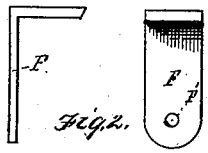
Figure 3:
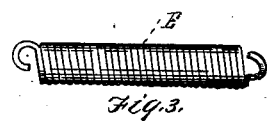
Figure 4:
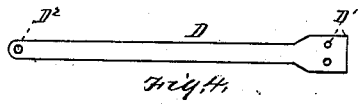
Figures 5, 7:
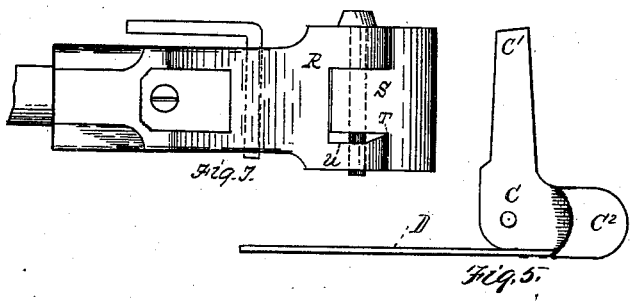
Figure 8:
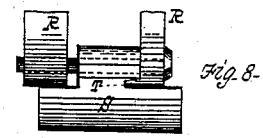
Figure 6:
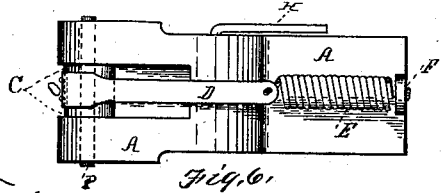

Figure 1 presents a flat horizontal view, representing the two couplings as they approach each other in the act of coupling, A representing the rotary hook $C^2$ as open to receive the rotary hook B' closed, the hook $C^2$ assuming the position of C, as shown by the dotted lines, when the two couplings are brought sufficiently close together. In Fig. 1 is also shown the pawl G, for locking and unlocking the rotary hook C, as may be required, and lever H, for operating the pawl, the lever H being connected to and operated by another lever projecting through and above the platform of the car, but not shown in the drawings; also the elastic strap D, for connecting the spiral spring E to rotary hook C, and the angular piece F, showing their several relations and attachments to the different parts. Fig. 6 is a vertical face view of Fig. 1 with the hook C closed; also showing the connections of strap d, spiral spring E, and draw-head A. Fig. 2 shows the angular piece F, to which one end of the spiral spring E is attached. Fig. 3 shows the spiral spring E; Fig. 4, elastic strap; Fig. 5, rotary hook detached from the draw-head, to which is attached the elastic strap D.

To accomplish my purpose I make the outer circle of the knuckle of the rotary hook C less in circumference than the knuckles on the draw-head A, to admit of the attachment of the strap D, the outside surface of the strap being slightly below the outside surface of the knuckle of the draw-head A, as shown at o, Figs. 1 and 6; also slightly cutting away a portion of the draw-head A, if necessary, as shown at P, Fig. 1. This arrangement prevents the strap D being injured or broken by coming in contact with the draw-head. The strap D or its equivalent may be made of any suitable material, and should be sufficiently elastic to allow of its readily yielding to the curved surface of the knuckle as it presents itself in the act of rotating, the strap D having a hole, $D^2$, for attaching the spring E. The strap D is attached to the rotary hook C in any suitable manner, the other end of the spring E being fastened or hooked to an angular piece, F, the same being preferably fastened to the draw-head, or may be attached to any other suitable place. The spring E or its equivalent should have sufficient tension to rotate the hook C from the position indicated by the broken lines to the position shown by the diagonal lines C', and to retain the same in the last-named position as the proper one for admitting the opposing hook and successfully coupling cars.

I will now proceed to describe my second device.

Figure 9:
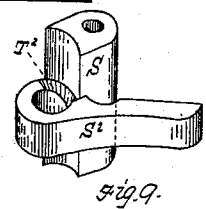

Fig. 7 is a vertical face view of the drawhead R, with the lower knuckle, U, having a spiral incline, T, the rotary hook S, Fig. 7, having a corresponding incline, $T^2$, as shown at Fig. 9. These inclines move upon each other in the act of rotating. The rotary hook moves upward upon the incline in the act of closing until it reaches nearly the highest point of the incline T. Upon being released by the pawl G it rotates outwardly, dropping to the point U and position of the diagonal lines C', Fig. 1, this outward rotation being accomplished by its own gravity, consequently occupying the lower position until force is applied to change it, thus avoiding the dangers and delay of placing the rotary hook in position by hand.

I do not claim any particular device for accomplishing the rotation and retaining of the rotary hook O or its equivalent, as the same can be accomplished in various ways.

What I do claim, and desire to secure by Letters Patent, is—

In a car-coupling composed of a bifurcated head and rotary interlocking hook, the combination, with said rotary hook, of means, substantially such as described, for automatically opening and retaining said hook in proper position for coupling.

CLINTON BROWNING.

Witnesses:
ALEX. McFARLAND.
DAVID HAMM.